US009986057B2

(12) United States Patent
Ebner et al.

(10) Patent No.: US 9,986,057 B2
(45) Date of Patent: May 29, 2018

(54) UI FRAMEWORK SUPPORT FOR PORTAL SYSTEMS

(71) Applicants: Rachel Ebner, Ra'anana (IL); Rafi Pinto, Rishon-Lezion (IL); Yael Limon, Kfar Saba (IL); Nati Gavriel, Beer Yaacov (IL); Yaron Ganor, Tel Mond (IL); Amir Yahalom, Herzliya (IL); Eliel Schurman, Binyamina (IL)

(72) Inventors: Rachel Ebner, Ra'anana (IL); Rafi Pinto, Rishon-Lezion (IL); Yael Limon, Kfar Saba (IL); Nati Gavriel, Beer Yaacov (IL); Yaron Ganor, Tel Mond (IL); Amir Yahalom, Herzliya (IL); Eliel Schurman, Binyamina (IL)

(73) Assignee: SAP PORTALS ISRAEL LTD., Ra'anana (IL)

( * ) Notice: Subject to any disclaimer, the term of this patent is extended or adjusted under 35 U.S.C. 154(b) by 633 days.

(21) Appl. No.: 14/546,219

(22) Filed: Nov. 18, 2014

(65) Prior Publication Data

US 2016/0100025 A1 Apr. 7, 2016

Related U.S. Application Data

(60) Provisional application No. 62/058,465, filed on Oct. 1, 2014.

(51) Int. Cl.
*G06F 15/16* (2006.01)
*H04L 29/08* (2006.01)
*G06F 17/30* (2006.01)

(52) U.S. Cl.
CPC .... *H04L 67/2819* (2013.01); *G06F 17/30887* (2013.01); *H04L 67/02* (2013.01); *H04L 67/34* (2013.01); *H04L 67/36* (2013.01)

(58) Field of Classification Search
CPC .............. G06F 17/30887; H04L 67/02; H04L 67/2819; H04L 67/34; H04L 67/36
USPC ................................ 709/201, 202, 203, 223
See application file for complete search history.

(56) References Cited

U.S. PATENT DOCUMENTS

| 7,089,279 B1 * | 8/2006 | Sakaguchi | G06F 17/30873 707/E17.111 |
| 7,269,664 B2 * | 9/2007 | Hutsch | G06F 9/541 345/672 |
| 7,840,648 B1 * | 11/2010 | Rosenstein | G06F 17/24 709/218 |
| 8,516,529 B2 * | 8/2013 | Lajoie | H04L 65/1016 709/201 |

(Continued)

*Primary Examiner* — Davoud Zand
(74) *Attorney, Agent, or Firm* — Buckley, Maschoff & Talwalkar LLC

(57) ABSTRACT

A system includes reception of a request from a client for application code to execute in a first Web page, determination that the application code is associated with a first UI framework, change of one or more Uniform Resource Locators of the application code to reference a portal server, change of one or more Uniform Resource Locators of the application code which are associated with the first UI framework to reference a first memory location of the portal server, the first memory location storing a plurality of files of the first UI framework, transmission of the changed application code to the client, and transmission to the client of a script to direct calls associated with the first UI framework to the portal server.

14 Claims, 9 Drawing Sheets

(56) References Cited

U.S. PATENT DOCUMENTS

| | | | |
|---|---|---|---|
| 2002/0002607 A1* | 1/2002 | Ludovici | H04L 41/0253 709/223 |
| 2002/0052935 A1* | 5/2002 | Paxhia | H04L 29/06 709/220 |
| 2003/0195974 A1* | 10/2003 | Ronning | G06F 8/65 709/230 |
| 2003/0212992 A1* | 11/2003 | Ronning | G06F 8/65 717/178 |
| 2006/0184998 A1* | 8/2006 | Smith | H04L 12/4679 726/3 |
| 2006/0236095 A1* | 10/2006 | Smith | H04L 63/0272 713/153 |
| 2006/0248442 A1* | 11/2006 | Rosenstein | G06F 17/24 715/205 |
| 2010/0231790 A1* | 9/2010 | Ansari | G06Q 30/04 348/552 |
| 2011/0107379 A1* | 5/2011 | Lajoie | H04L 65/1016 725/87 |
| 2011/0161178 A1* | 6/2011 | Rosenstein | G06F 17/24 705/14.69 |

* cited by examiner

UI FRAMEWORK SUPPORT FOR PORTAL SYSTEMS

CROSS REFERENCE TO RELATED APPLICATIONS

This application claims benefit to and priority of U.S. Provisional Patent Application Ser. No. 62/058,465, filed Oct. 1, 2014, the contents of which are hereby incorporated by reference in their entirety for all purposes.

BACKGROUND

Portal-based systems provide Web clients with a single point of entry to disparate backend applications, servers and/or services. The backend applications, servers and/or services may be implemented by one or more entities (e.g., a corporation, a public source, a Software-as-a-Service provider).

User interface (UI) applications may be used to present information from these entities to a user via a Web client. In some cases, one portal page may present many applications that come from different locations. FIG. 1 illustrates a portal-based system which supports UI applications. In operation, browser 110 calls portal server 120 using a Uniform Resource Locator (URL) associated with a page stored on portal server 120. In response, portal server 120 transmits portal page 115 to browser 110. Browser 110 parses page 115 and requests one or many applications specified in page 115 from application loader 124.

Application loader 124 acquires application code of the requested application and parses the application code to convert all URLs within the application code to URLs associated with proxy 122. The application code may include javascript files, CSS files or any other file types containing relative or absolute URLs, and the conversion of URLs is done according to logic or semantics of the portal and proxy system. For example, a URL within the acquired application code may refer to one of applications/servers/services 130-134 of FIG. 1, and application loader 124 changes this URL to a URL of proxy 122. The new URL may indicate the referred-to one of applications/servers/services 130-134. Application loader 124 then provides the changed application code 117 to browser 110.

During execution, application code 117 may call one of the changed URLs, which results in transmission of a request to proxy 122. Proxy 122 may then forward a corresponding request to a backend location indicated by the changed URL. Portal page 115 also includes XHRWrapper 119. In a case that execution of application code 117 generates and calls a URL which was not explicitly specified in application code 117 (i.e., an AJAX call), XHRWrapper 119 overrides the native XMLHttpResponse function of browser 110 to direct this call to proxy 122 as illustrated.

Increasingly, UI applications are developed based on UI frameworks. Execution of such a UI application requires access to files of its associated UI framework and may include requests for other resources of the UI framework. The above-described portal-based systems fail to efficiently support framework-based UI applications.

DETAILED DESCRIPTION

Figure 1:
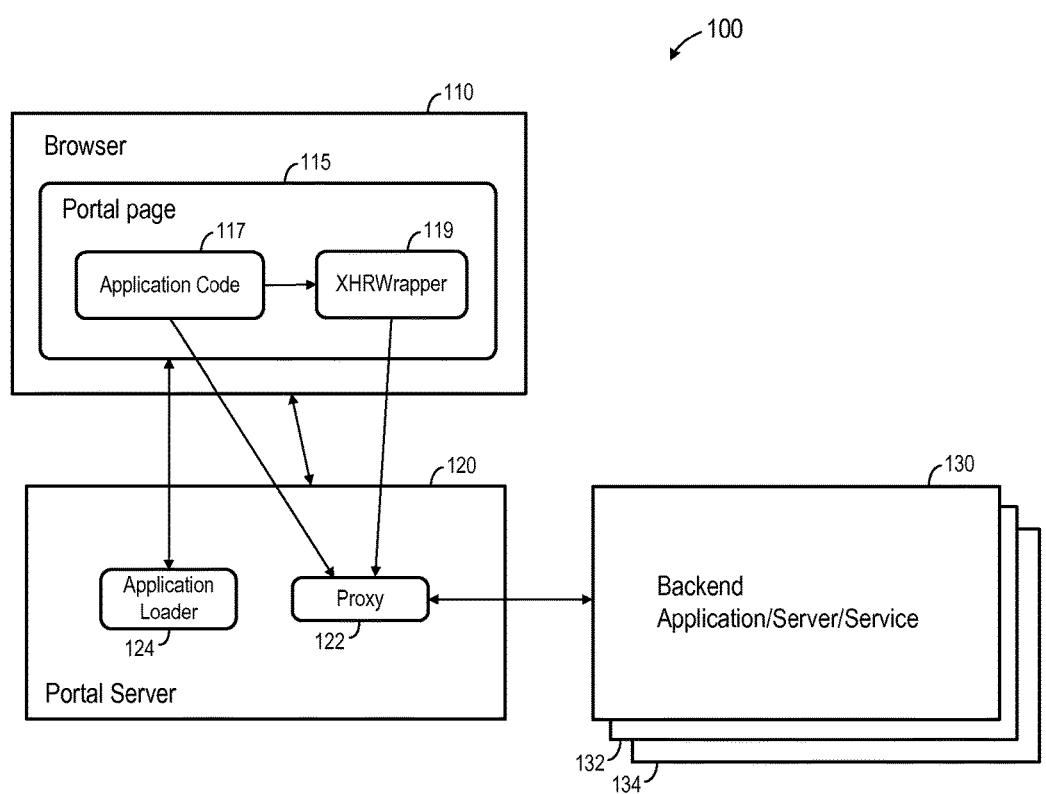
FIG. 1 is a block diagram of a system.
Figure 2:
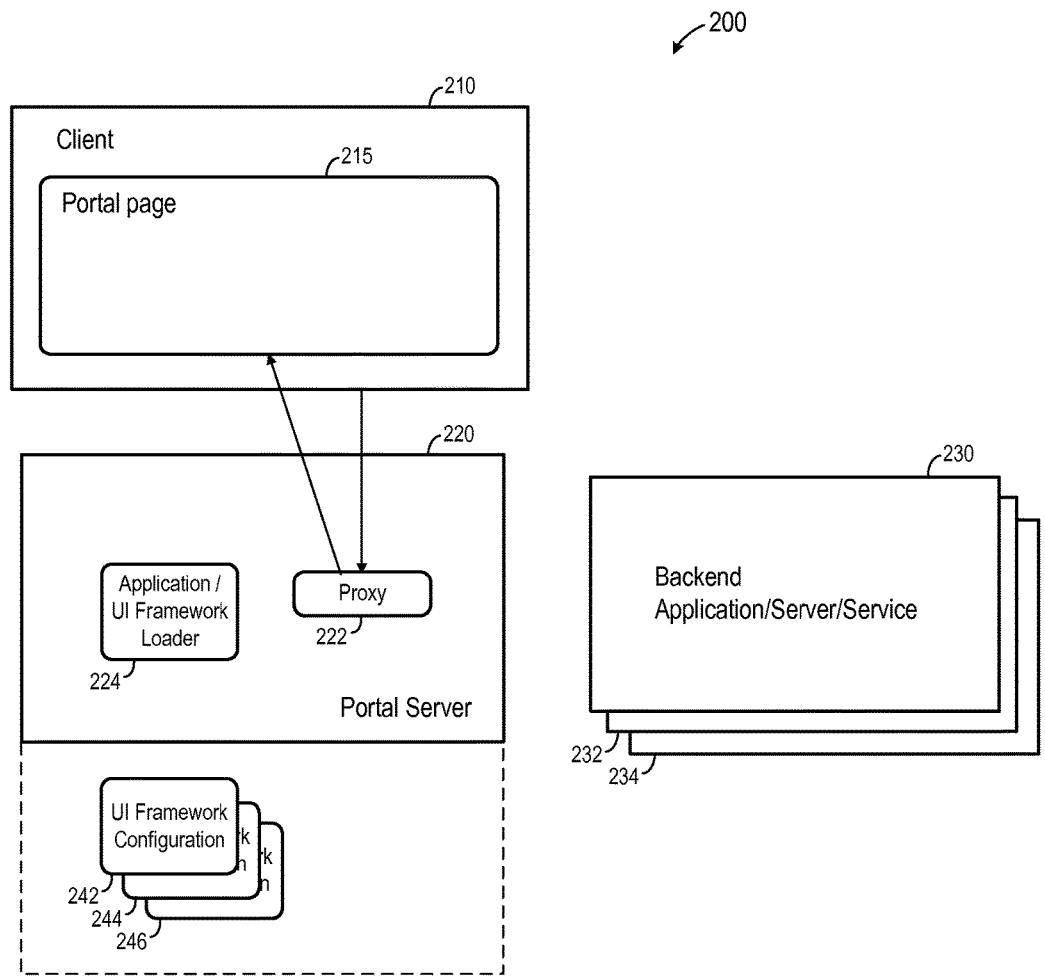
FIG. 2 is a block diagram of a system according to some embodiments.

FIG. 2 is a block diagram of system 200 according to some embodiments. FIG. 2 represents a logical architecture for describing processes according to some embodiments, and actual implementations may include more or different logical elements arranged in other manners. Each logical element may be implemented by computing hardware and/or by program code executed by one or more processors of one or more computing devices, but embodiments are not limited thereto.

FIG. 2 illustrates client 210, portal server 220 and resources 230-234. Client 210 may comprise any client application configured to communicate with portal server 220 via any protocol that is or becomes known. According to some embodiments, client 210 is a Web browser and portal server 220 implements a Web server. Client 210 may comprise a proprietary dedicated application for communicating with portal server 220.

Portal server 220 includes proxy 222 and application/UI framework loader 224. As a security-based limitation, client 210 is blocked from making Hypertext Transfer Protocol (HTTP) requests to servers other than the server from which a current page is loaded. Proxy 222 is intended to address this limitation. Proxy 222 may receive HTTP requests from client 210 and redirect those requests to one of resources 230-234 based on information contained in the request. Application/UI framework loader 224 may operate as will be described below.

Each of UI framework configurations 242-246 includes data associated with a respective UI framework. The data may include a name/id/description of the associated UI framework, a library of files to support UI applications which are based on the UI framework and a script for redirecting calls from a UI application that are specific to the UI framework to an appropriate location of portal server 220. Examples of UI frameworks that exist today are OpenUI5 and Angular JS. The following is a possible UI framework configuration in JavaScript Object Notation (JSON) format:

```
{
    name: "SAPUI5",
    fileLocation: "ui5",
    AvailableRevisions: ["1.5", "1.6", "1.7"],
    proxyScriptClient: "ui5_xhrwrapper_hook.js",
    proxyScriptServer: ""
}
```

UI framework configurations 242-246 may be located within portal server 220, or one or more of UI framework configurations 242-246 may be remote from but accessible by portal server 220. As illustrated in FIG. 2, client 210 has issued a request to portal server 220. The request may comprise an HTTP request to a URL associated with portal server 220. In response, portal server 220 transmits portal page 215 to browser 210. According to some embodiments, it will be assumed that portal page 215 specifies one or more UI applications which are intended to be loaded and executed for display within portal page 215. Accordingly, client 210 parses the code (e.g., Hypertext Markup Language (HTML)) of portal page 215, encounters an identifier (e.g., a URL) of a UI application to be loaded, and issues a corresponding request to proxy 222.

Figure 3:
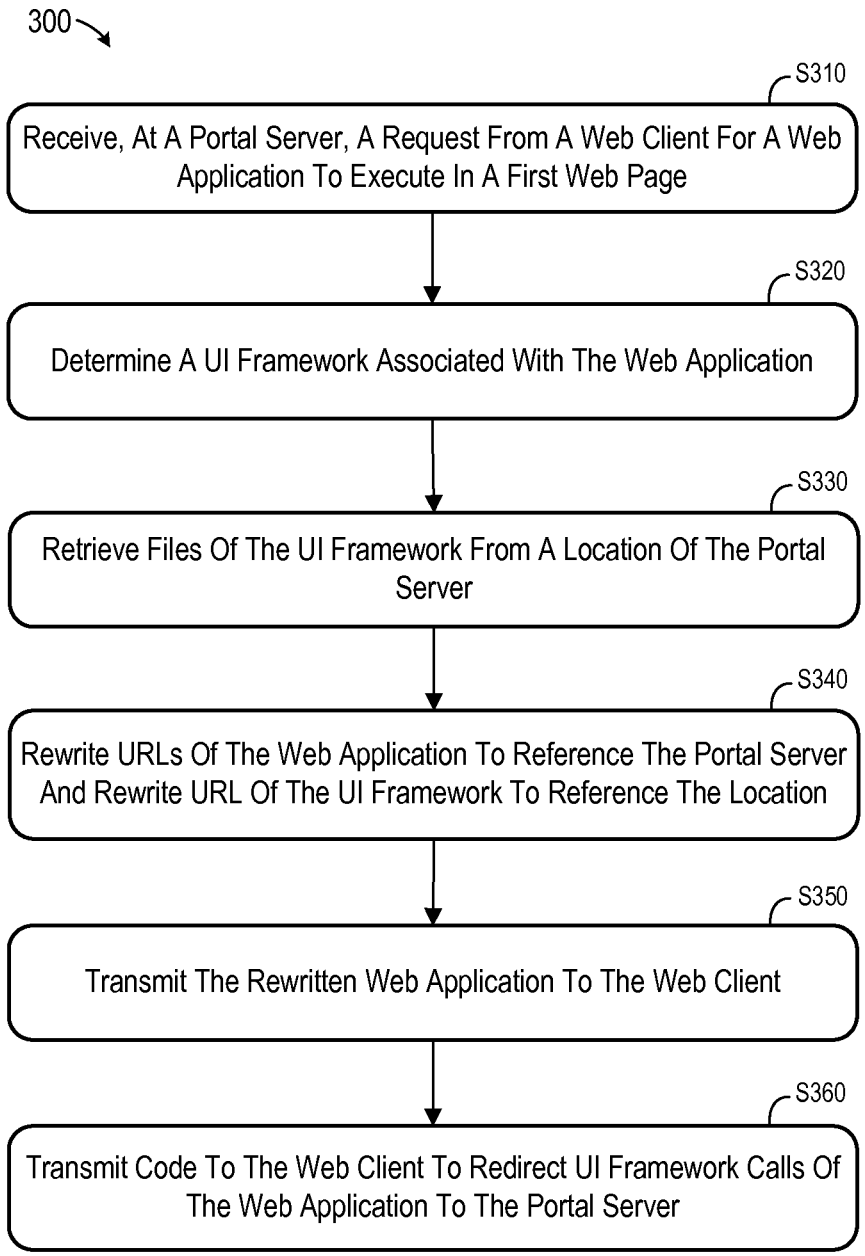
FIG. 3 is a flow diagram of a process according to some embodiments.

FIG. 3 comprises flow diagram of process 300 for responding to such a request according to some embodiments. In some embodiments, various hardware elements of system 200 execute program code to perform process 300. In some embodiments, hard-wired circuitry may be used in place of, or in combination with, program code for implementation of processes according to some embodiments. Embodiments are therefore not limited to any specific combination of hardware and software.

Figure 4:
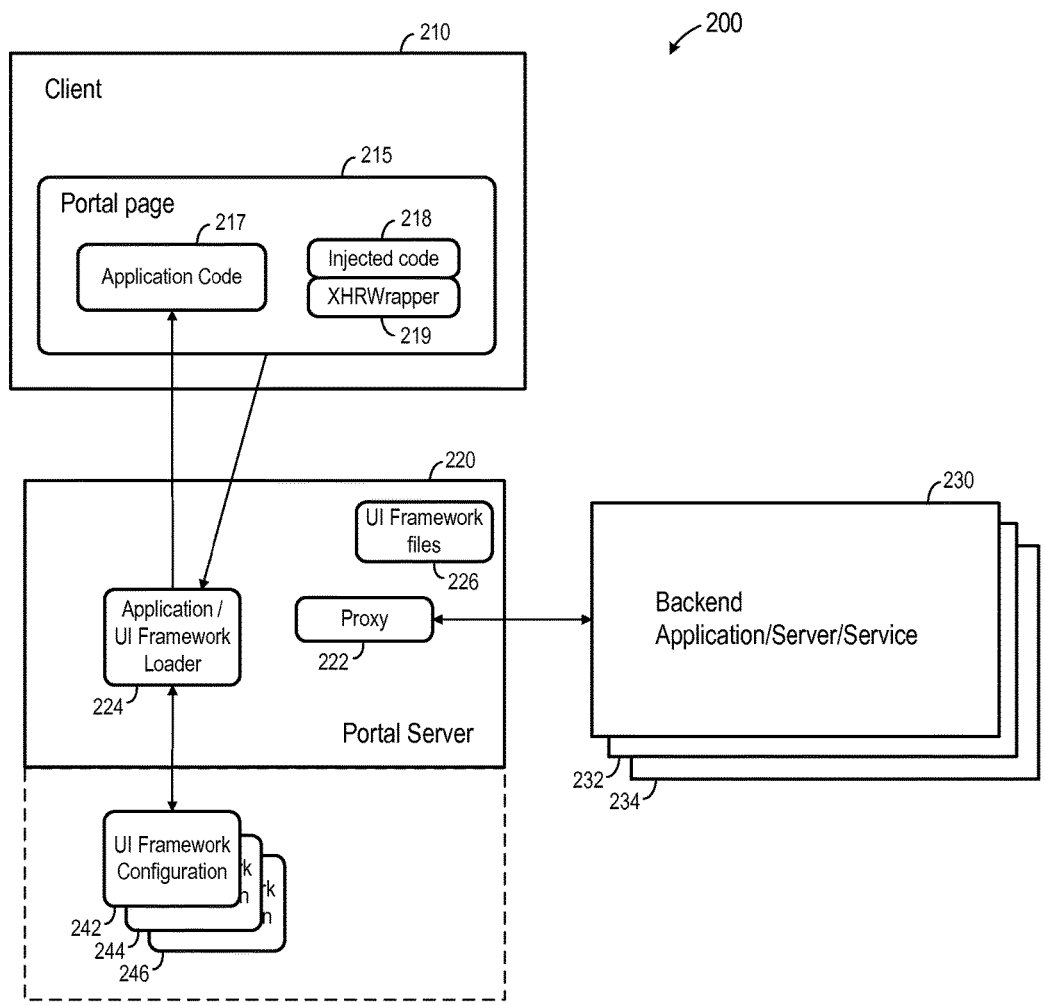
FIG. 4 is a block diagram of a system according to some embodiments.

Initially, at S310, the request is received at the portal server. The request is received from a Web client and is a request for a Web application to execute in a first Web page. FIG. 4 illustrates process 300 according to some embodiments. As shown, application/UI framework loader 224 receives a request for application code from portal page 215.

Next, a UI framework associated with the Web application is determined at S320. According to some embodiments of S320, application/UI framework loader 224 retrieves the application code from a local or remote repository. Although application/UI framework loader 224 and proxy 222 are described herein as performing several functions, one or more of these functions may be performed by the other or by one or more other components of portal server 220. Continuing with the present example, application/UI framework loader 224 then parses the application code to determine the UI framework based on which the application was developed. In this regard, the UI framework may be identified by name and version within the application code.

Files of the determined UI framework are loaded into a location (e.g., a folder) of portal server 220 at S330. Referring to FIG. 4, it is assumed that the UI framework identified at S320 is associated with UI framework configuration 244. Application/UI framework loader 224 therefore retrieves files of the UI framework from a location of portal server 220 which is specified in the UI framework configuration 244 at S330. This location is illustrated in FIG. 4 as UI framework files 226.

Application/UI framework loader 224 rewrites URLs of the application code to reference portal server 220 at S340. Any URLs of the application code which indicate a location of UI framework files are rewritten to indicate the location of UI framework files 226. At S350, loader 224 transmits the rewritten application code 217 to client 210, as described above.

At S360, application/UI framework loader 224 also transmits additional code to client 210. Injected code 218 is to redirect UI framework calls issued by executing application code 217 to other UI framework files or to backend application\server\service to portal server 220 via proxy 222. These calls may include including framework-specific hooks and events.

Figure 5:
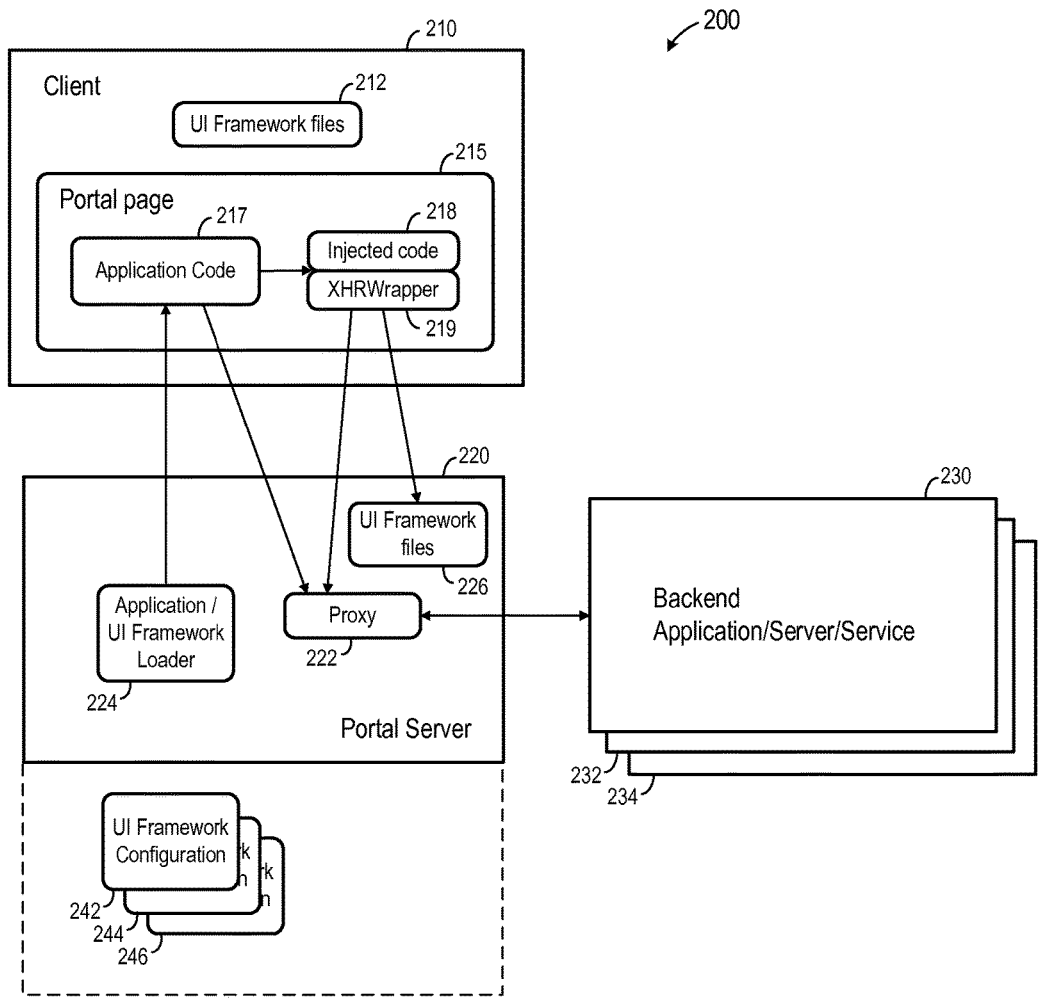
FIG. 5 is a block diagram of a system according to some embodiments.

FIG. 5 illustrates operation of system 200 after execution of process 300. Upon initial execution, application code 217 issues a request for files of its associated UI framework. The request may include a rewritten URL associated with proxy 222 or URLs directly associated with UI framework files 226. Proxy 222 receives the request, and application/UI framework loader 224 retrieves the required files from files 226 and forwards the required UI framework files to client 210, where the files are stored as UI framework files 212. In some cases, the files are stored in a cache and available for next requests from client 210 for these files.

During execution, application code 217 may dynamically create code to request UI framework files. Such requests are intercepted by injected code 218 and redirected to proxy 222 or directly to framework files 226 of portal server 220.

Application code 217 also executes to request resources from elements 230-234 by calling the rewritten URLs described above. AJAX calls made by executing application code 217 are intercepted by XHRWrapper 219 and redirected to portal server 220 as described above. AJAX calls made from the UI framework code are intercepted by XHRWrapper and handled by the injected code 218. Any other application code or UI framework code that generates URLs dynamically is also handled by injected code 218.

Figure 6:
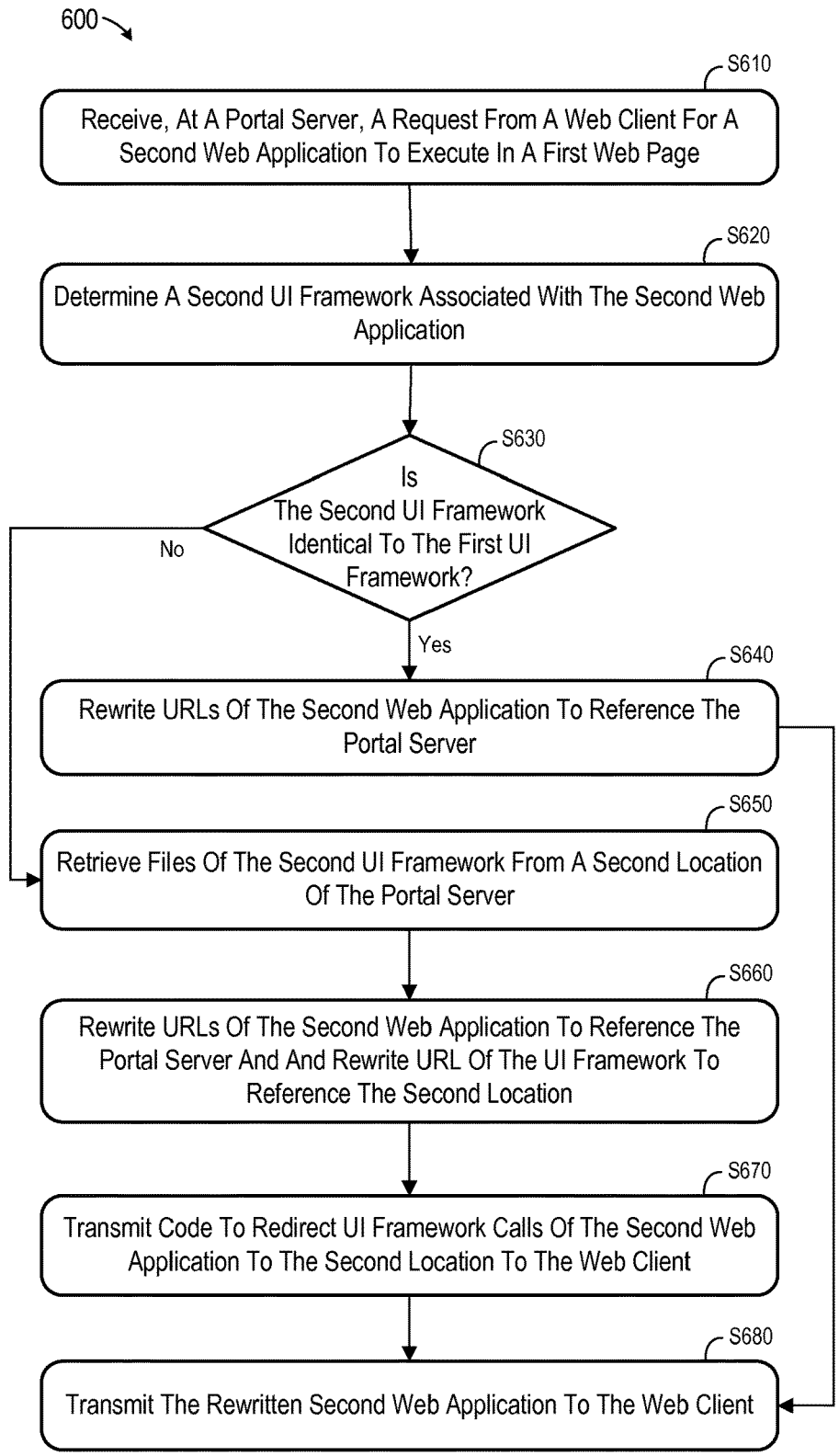
FIG. 6 is a flow diagram of a process according to some embodiments.

FIG. 6 is a flow diagram of process 600 according to some embodiments. Process 600 assumes that a first Web application has already been provided to a Web client for execution in a first Web page. In this regard, a request is received at S610 for a second Web application to execute in the first Web page.

At S620, loader 224 determines a second UI framework associated with the second application. It will be assumed that the second UI framework is identical to the UI framework of the prior example, therefore flow proceeds from S630 to S640 to rewrite the URLs of the second Web application. Flow then continues to S680 to transmit the rewritten second Web application to the Web client.

Figure 7:
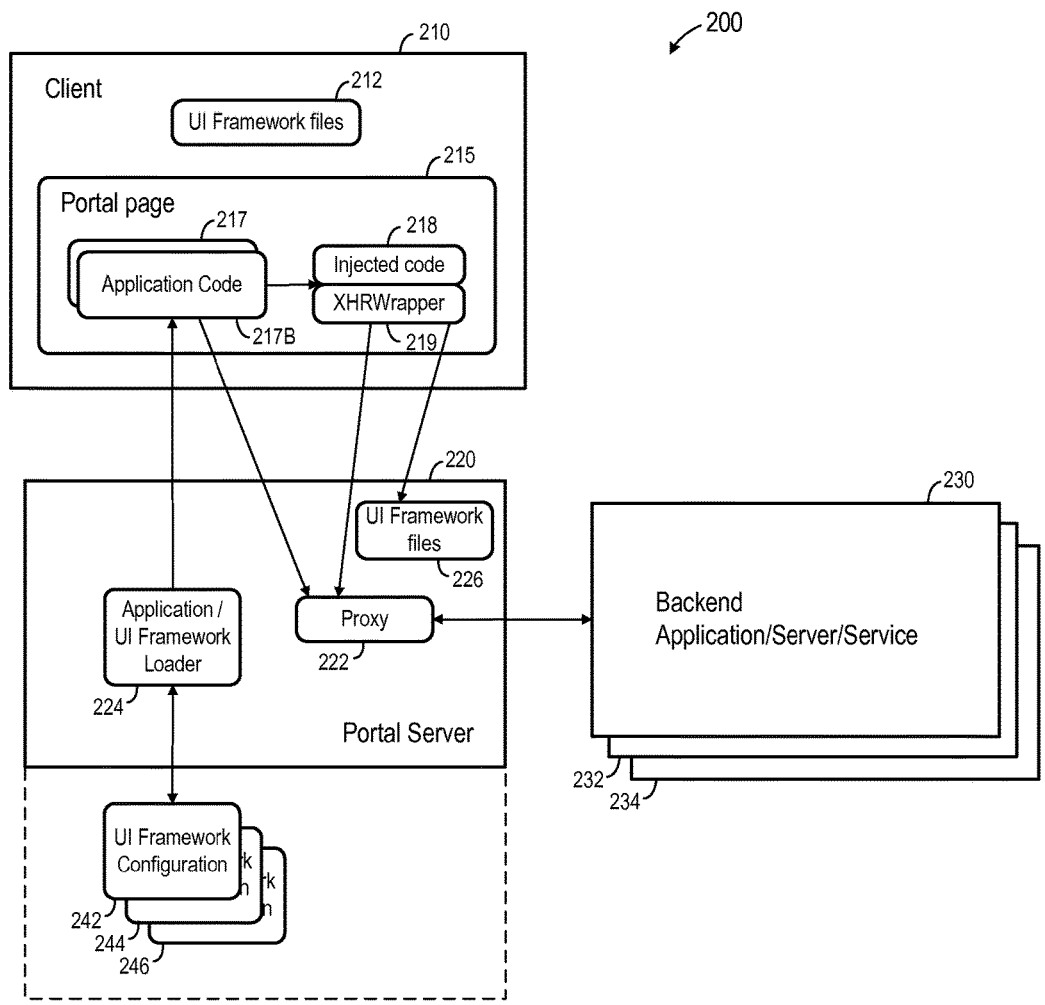
FIG. 7 is a block diagram of a system according to some embodiments.

FIG. 7 illustrates an embodiment of the foregoing, in which rewritten application code 217B is stored by client 210. Upon execution of application code 217B, it is determined that required UI framework files are already cached locally at client 210. This determination is made because the URLs of application code 217B which reference the required UI framework files indicate the same location of portal server 220 (i.e., the location of UI framework files 226) from which UI framework files 212 were retrieved. Accordingly, the UI framework files are not requested from portal server 220. Application code 217B may dynamically create code to request additional UI framework files. If these additional files aren't already cached in UI framework files 212, the request is intercepted by injected code 218 and redirected to proxy 222 or directly to framework files 226 of portal server 220.

Application code 217B may also execute to request resources from elements 230-234 by calling the rewritten URLs described above. AJAX calls made by dynamic code of application code 217B are intercepted by XHRWrapper 219 and redirected to proxy 222 as described above.

Figure 8:
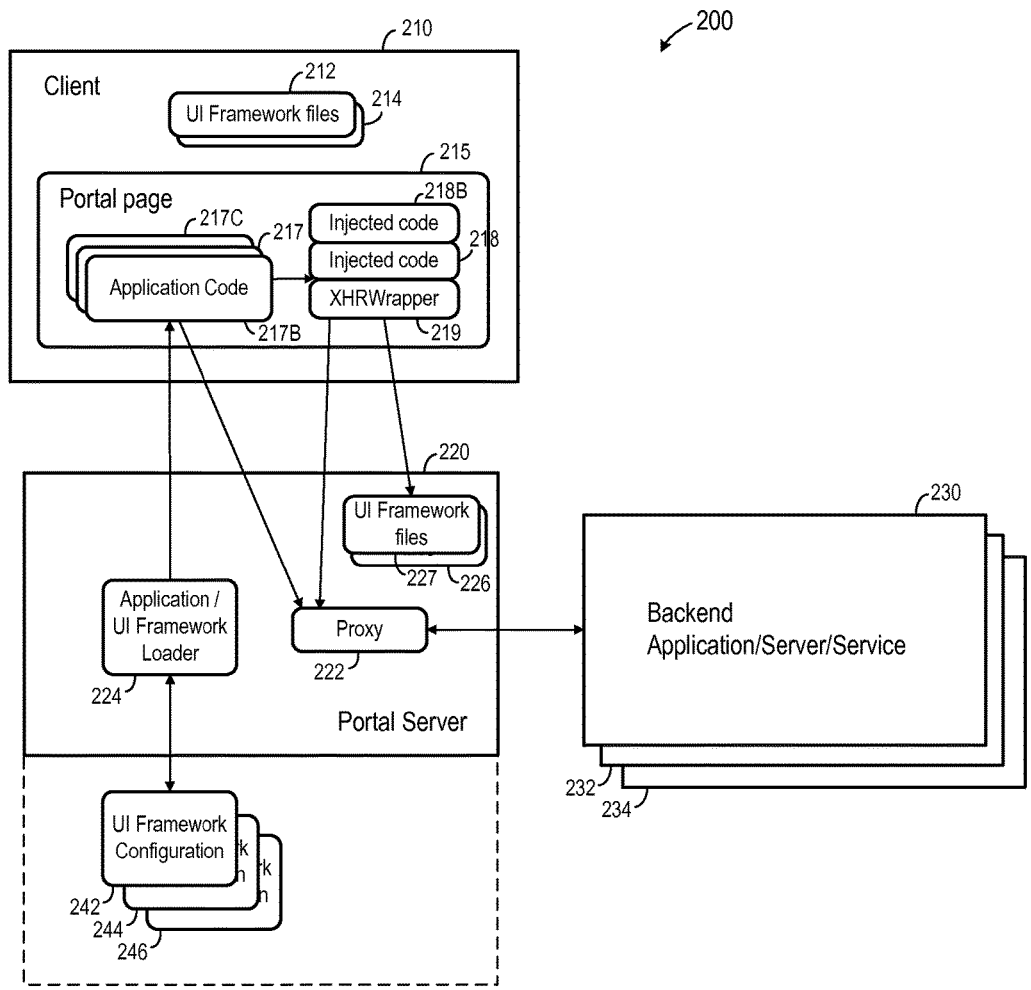
FIG. 8 is a block diagram of a system according to some embodiments.

It will now be assumed that process 600 executes again in response to a request for third Web application to be included in portal page 215. A third UI framework associated with the third Web application is determined at S620. At S630, it is determined that the third UI framework is not identical to any previously-loaded UI framework. Accordingly, files of the third UI framework are retrieved from a second location (e.g., UI framework files 227) of portal server 220 specified by corresponding UI configuration 242 or 246 at S650, as illustrated in FIG. 8.

Application/UI framework loader 224 then rewrites URLs of the application code to reference the portal server at S660. Also, URLs which reference the third UI framework are rewritten to reference the location of UI framework files 227. Next, at S670, code 218B to redirect framework calls of the third Web application to the second location is transmitted to the Web client. Injected code 218B may be retrieved from UI framework configuration 242-246 which is associated with the UI framework of application code 217C. Loader 224 then transmits the rewritten application code 217C to client 210 at S680, as described above.

As described with respect to application code 217, application code 217C initially issues a request for files of its associated UI framework, because these files are not locally-available to client 210. The request includes a rewritten URL associated with proxy 222. Proxy 222 receives the request and application/UI framework loader 224 retrieved the required files from files 227 and forwards the required UI framework files to client 210, where the files are stored as UI framework files 214.

If application code 217C dynamically creates code to request additional UI framework files, these requests are intercepted by injected code 218B and redirected to proxy 222 or directly to framework files 228 of portal server 220.

Application code 217C also executes to request resources from elements 230-234 by calling the rewritten URLs described above. AJAX calls made by executing application code 217C are intercepted by XHRWrapper 219 and redirected to portal server 220 as described above.

Figure 9:
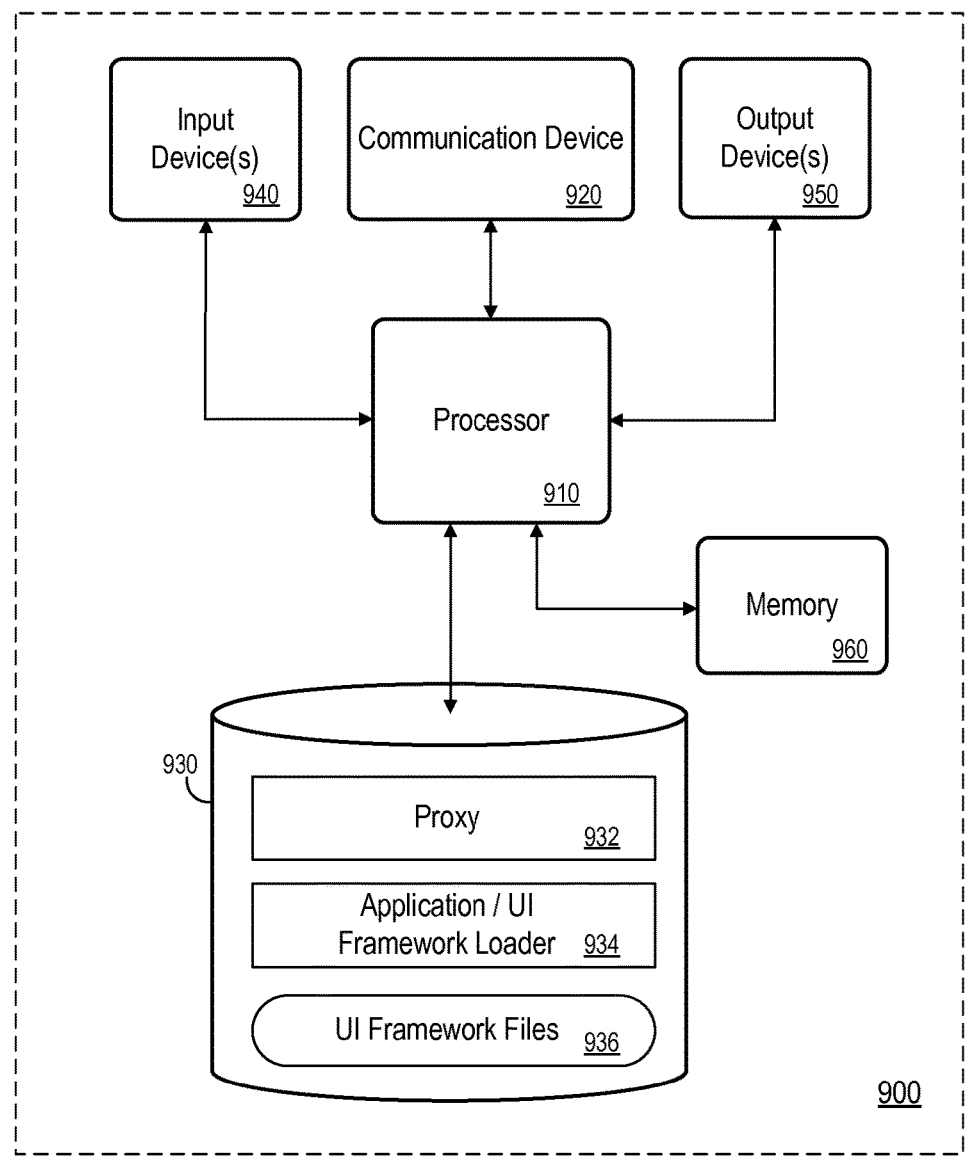
FIG. 9 is a block diagram of a computing device according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of one or more elements of system 200, such as portal system 220. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as client 210 or resources 230-234. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to manipulate graphical user interfaces and to input information into apparatus 900. Output device(s) 950 may comprise, for example, a display (e.g., a display screen) a speaker, and/or a printer.

Data storage device 930 may comprise any device, including combinations of magnetic storage devices (e.g., magnetic tape, hard disk drives and flash memory), optical storage devices, Read Only Memory (ROM) devices, etc., while memory 960 may comprise Random Access Memory (RAM).

Proxy 932 and application/UI framework loader 934 of data storage device 930 may comprise program code executable by processor 910 to provide any of the functions described herein with respect to proxy 222 and loader 224. UI framework files 936 may comprise files 226 and/or 227 of FIG. 8. Data storage device 930 may also store data and other program code for providing additional functionality and/or which are necessary for operation thereof, such as device drivers, operating system files, etc.

Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 200 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations.

What is claimed is:

1. A system comprising:
  a memory storing processor-executable program code; and
  a processor to execute the processor-executable program code in order to cause the first computing system to:
  receive a request from a client for application code to execute in a first Web page;
  determine that the application code is associated with a first UI framework;
  change one or more Uniform Resource Locators of the application code to reference a portal server;
  rewrite, via an Application/UI framework loader, any Uniform Resource Locators of the application code which indicate a location of the first UI framework to reference a first memory location storing a plurality of UI framework files in the portal server;
  transmit the changed application code to the client;
  transmit to the client a script to direct calls associated with the first UI framework to the portal server;
  receive a request from the client for second application code to execute in the first Web page;
  determine that the second application code is associated with the first UI framework;
  change one or more Uniform Resource Locators of the second application code to reference the portal server; and
  transmit the changed second application code to the client;
  receive a request from the client for third application code to execute in the first Web page;
  determine that the third application code is associated with a second UI framework;
  change one or more Uniform Resource Locators of the third application code to reference the portal server;
  change one or more Uniform Resource Locators of the third application code which are associated with the second UI framework to reference a second memory location of the portal server, the second memory location storing a plurality of files of the second UI framework;
  transmit the changed third application code to the client; and transmit to the client a script to direct calls associated with the second UI framework to the portal server.

2. A system according to claim 1, wherein the processor is to further execute the processor-executable program code in order to cause the first computing system to:
receive a request from a second client for the first application code to execute in a second Web page;
determine that the first application code is associated with the first UI framework;
transmit the changed first application code to the second client; and
transmit to the second client the script to direct calls associated with the first UI framework to the portal server.

3. A system comprising:
a memory storing processor-executable program code; and
a processor to execute the processor-executable program code in order to cause the first computing system to:
receive a request from a client for application code to execute in a first Web page;
determine that the application code is associated with a first UI framework;
change one or more Uniform Resource Locators of the application code to reference a portal server;
rewrite, via an Application/UI framework loader, one or more Uniform Resource Locators of the application code which indicate a location of the first UI framework to reference a first memory location storing a plurality of UI framework files in the portal server;
transmit the changed application code to the client; transmit to the client a script to direct calls associated with the first UI framework to the portal server;
receive a request from the client for second application code to execute in the first Web page;
determine that the second application code is associated with a second UI framework;
change one or more Uniform Resource Locators of the second application code to reference the portal server;
change one or more Uniform Resource Locators of the second application code which are associated with the second UI framework to reference a second memory location of the portal server, the second memory location storing a plurality of files of the second UI framework;
transmit the changed second application code to the client; and
transmit to the client a script to direct calls associated with the second UI framework to the portal server.

4. A system according to claim 3, wherein the processor is to further execute the processor-executable program code in order to cause the first computing system to:
receive a request from a second client for the first application code to execute in a second Web page;
determine that the first application code is associated with the first UI framework;
transmit the changed first application code to the second client; and
transmit to the second client the script to direct calls associated with the first UI framework to the portal server.

5. A system comprising:
a memory storing processor-executable program code; and
a processor to execute the processor-executable program code in order to cause the first computing system to:
receive a request from a client for application code to execute in a first Web page;
determine that the application code is associated with a first UI framework;
change one or more Uniform Resource Locators of the application code to reference a portal server;
rewrite, via an Application/UI framework loader, one or more Uniform Resource Locators of the application code which indicate a location of the first UI framework to reference a first memory location storing a plurality of UI framework files in the portal;
transmit the changed application code to the client;
transmit to the client a script to direct calls associated with the first UI framework to the portal server;
receive a request from a second client for second application code to execute in a second Web page;
determine that the second application code is associated with a second UI framework;
change one or more Uniform Resource Locators of the second application code to reference the portal server;
change one or more Uniform Resource Locators of the second application code which are associated with the second UI framework to reference a second memory location of the portal server, the second memory location storing a plurality of files of the second UI framework;
transmit the changed second application code to the second client; and
transmit to the second client a script to direct calls associated with the second UI framework to the portal server.

6. A method executed by a computing system, the method comprising:
receiving a request from a client for application code to execute in a first Web page;
determining that the application code is associated with a first UI framework;
changing one or more Uniform Resource Locators of the application code to reference a portal server;
rewriting, via an Application/UI framework loader, one or more Uniform Resource Locators of the application code which indicate a location of the first UI framework to reference a first memory location storing a plurality of UI framework files in the portal server;
transmitting the changed application code to the client;
transmitting to the client a script to direct calls associated with the first UI framework to the portal server;
receiving a request from the client for second application code to execute in the first Web page;
determining that the second application code is associated with the first UI framework;
changing one or more Uniform Resource Locators of the second application code to reference the portal server;
transmitting the changed second application code to the client;
receiving a request from the client for third application code to execute in the first Web page;
determining that the third application code is associated with a second UI framework;
changing one or more Uniform Resource Locators of the third application code to reference the portal server;
changing one or more Uniform Resource Locators of the third application code which are associated with the second UI framework to reference a second memory location of the portal server, the second memory location storing a plurality of files of the second UI framework;

transmitting the changed third application code to the client; and transmitting to the client a script to direct calls associated with the second UI framework to the portal server.

7. A method according to claim 6, further comprising:

receiving a request from a second client for the first application code to execute in a second Web page;

determining that the first application code is associated with the first UI framework;

transmitting the changed first application code to the second client; and transmitting to the second client the script to direct calls associated with the first UI framework to the portal server.

8. A method comprising:

receiving a request from a client for application code to execute in a first Web page;

determining that the application code is associated with a first UI framework;

changing one or more Uniform Resource Locators of the application code to reference a portal server;

rewriting, via an Application/UI framework loader, one or more Uniform Resource Locators of the application code which indicate a location of the first UI framework to reference a first memory location storing a plurality of UI framework files in the portal server;

transmitting the changed application code to the client;

transmitting to the client a script to direct calls associated with the first UI framework to the portal server;

receiving a request from the client for second application code to execute in the first Web page;

determining that the second application code is associated with a second UI framework;

changing one or more Uniform Resource Locators of the second application code to reference the portal server;

changing one or more Uniform Resource Locators of the second application code which are associated with the second UI framework to reference a second memory location of the portal server, the second memory location storing a plurality of files of the second UI framework;

transmitting the changed second application code to the client; and transmitting to the client a script to direct calls associated with the second UI framework to the portal server.

9. A method according to claim 8, further comprising:

receiving a request from a second client for the first application code to execute in a second Web page;

determining that the first application code is associated with the first UI framework;

transmitting the changed first application code to the second client; and transmitting to the second client the script to direct calls associated with the first UI framework to the portal server.

10. A method comprising:

receiving a request from a client for application code to execute in a first Web page;

determining that the application code is associated with a first UI framework;

changing one or more Uniform Resource Locators of the application code to reference a portal server;

rewriting, via an Application/UI framework loader, one or more Uniform Resource Locators of the application code which indicate a location of the first UI framework to reference a first memory location storing a plurality of UI framework files in the portal server;

transmitting the changed application code to the client;

transmitting to the client a script to direct calls associated with the first UI framework to the portal server;

receiving a request from a second client for second application code to execute in a second Web page;

determining that the second application code is associated with a second UI framework;

changing one or more Uniform Resource Locators of the second application code to reference the portal server;

change one or more Uniform Resource Locators of the second application code which are associated with the second UI framework to reference a second memory location of the portal server, the second memory location storing a plurality of files of the second UI framework;

transmitting the changed second application code to the second client; and transmitting to the second client a script to direct calls associated with the second UI framework to the portal server.

11. A non-transitory computer-readable medium storing program code, the program code executable by a processor of a computing system to cause the computing system to:

receive a request from a client for application code to execute in a first Web page;

determine that the application code is associated with a first UI framework;

change one or more Uniform Resource Locators of the application code to reference a portal server;

rewrite, via an Application/UI framework loader, one or more Uniform Resource Locators of the application code which indicate a location of the first UI framework to reference a first memory location storing a plurality of UI framework files in the portal server;

transmit the changed application code to the client;

transmit to the client a script to direct calls associated with the first UI framework to the portal server;

receive a request from the client for second application code to execute in the first Web page;

determine that the second application code is associated with the first UI framework;

change one or more Uniform Resource Locators of the second application code to reference the portal server;

transmit the changed second application code to the client;

receive a request from the client for third application code to execute in the first Web page;

determine that the third application code is associated with a second UI framework;

change one or more Uniform Resource Locators of the third application code to reference the portal server;

change one or more Uniform Resource Locators of the third application code which the second UI framework to reference a second memory location of the portal server, the second memory location storing a plurality of files of the second UI framework;

transmit the changed third application code to the client; and transmit to the client a script to direct calls associated with the second UI framework to the portal server.

12. A medium according to claim 11, the program code executable by a processor of a computing system to cause the computing system to:

receive a request from a second client for the first application code to execute in a second Web page;

determine that the first application code is associated with the first UI framework;

transmit the changed first application code to the second client; and transmit to the second client the script to direct calls associated with the first UI framework to the portal server.

13. A non-transitory computer-readable medium storing program code, the program code executable by a processor of a computing system to cause the computing system to:

receive a request from a client for application code to execute in a first Web page;

determine that the application code is associated with a first UI framework;

change one or more Uniform Resource Locators of the application code to reference a portal server;

rewrite, via an Application/UI framework loader, one or more Uniform Resource Locators of the application code which indicate a location of the first UI framework to reference a first memory location storing a plurality of UI framework files in the portal server;

transmit the changed application code to the client;

transmit to the client a script to direct calls associated with the first UI framework to the portal server;

receive a request from the client for second application code to execute in the first Web page;

determine that the second application code is associated with a second UI framework;

change one or more Uniform Resource Locators of the second application code to reference the portal server;

change one or more Uniform Resource Locators of the second application code which are associated with the second UI framework to reference a second memory location of the portal server, the second memory location storing a plurality of files of the second UI framework;

transmit the changed second application code to the client; and transmit to the client a script to direct calls associated with the second UI framework to the portal server.

14. A medium according to claim 13, the program code executable by a processor of a computing system to cause the computing system to:

receive a request from a second client for the first application code to execute in a second Web page;

determine that the first application code is associated with the first UI framework;

transmit the changed first application code to the second client; and transmit to the second client the script to direct calls associated with the first UI framework to the portal server.

* * * * *